United States Patent
Zeghmi et al.

(10) Patent No.: US 7,870,484 B2
(45) Date of Patent: Jan. 11, 2011

(54) PAGE FLOW FRAMEWORK

(75) Inventors: Taleb Tewfik Zeghmi, Seattle, WA (US); Ronald R. Martinsen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/757,512

(22) Filed: Jun. 4, 2007

(65) Prior Publication Data

US 2008/0301576 A1  Dec. 4, 2008

(51) Int. Cl.
G06F 17/21 (2006.01)
(52) U.S. Cl. .................. 715/254; 715/221; 715/222; 715/705; 715/712; 715/713
(58) Field of Classification Search ......... 715/221–226, 715/254, 705, 712, 713
See application file for complete search history.

(56) References Cited

U.S. PATENT DOCUMENTS

| | | | | |
|---|---|---|---|---|
| 5,574,846 A * | 11/1996 | Yoshimura et al. | ........... | 345/418 |
| 6,003,046 A | 12/1999 | Nielsen | | |
| 6,104,393 A * | 8/2000 | Santos-Gomez | ............ | 715/763 |
| 6,205,527 B1 * | 3/2001 | Goshey et al. | .............. | 711/162 |
| 6,397,217 B1 | 5/2002 | Melbin | | |
| 6,502,234 B1 * | 12/2002 | Gauthier et al. | ............. | 717/107 |
| 6,564,375 B1 * | 5/2003 | Jiang | ........................... | 717/165 |
| 6,772,156 B1 * | 8/2004 | Rogers et al. | ...................... | 1/1 |
| 6,973,624 B2 | 12/2005 | Miksovsky et al. | | |
| 7,051,069 B2 | 5/2006 | Smithline et al. | | |
| 7,089,500 B2 * | 8/2006 | Li | .............................. | 715/763 |
| 7,412,433 B2 * | 8/2008 | Anglin et al. | ...................... | 1/1 |
| 7,634,490 B2 * | 12/2009 | Krieg et al. | ......................... | 1/1 |
| 7,770,123 B1 * | 8/2010 | Meyer et al. | ................. | 715/760 |
| 2002/0002546 A1 * | 1/2002 | Doerr et al. | .................... | 706/12 |
| 2002/0054138 A1 * | 5/2002 | Hennum | ..................... | 345/804 |
| 2002/0156815 A1 | 10/2002 | Davia | | |
| 2003/0081002 A1 * | 5/2003 | De Vorchik et al. | ......... | 345/762 |
| 2004/0205464 A1 | 10/2004 | Bates et al. | | |
| 2005/0050438 A1 | 3/2005 | Cheung et al. | | |
| 2005/0204337 A1 * | 9/2005 | Diesel et al. | ................. | 717/113 |
| 2007/0011650 A1 | 1/2007 | Hage et al. | | |
| 2007/0043832 A1 | 2/2007 | Sane | | |
| 2007/0055747 A1 | 3/2007 | Loh | | |

OTHER PUBLICATIONS

Dew, "Java Page Flow", available at least as early as Mar. 27, 2007 at <<http://weblogic.sys-con.com/read/42942.htm>>, SYS-CON Publications, 1994-2007, pp. 1-3.

Beier, et al:, "The Bull's-Eye: A Framework for Web Application User Interface Design Guidelines", CHI 2003, Apr. 5-10, 2003, Volume No. 5, Issue No. 1, ACM, 2003, pp. 489-496.

* cited by examiner

*Primary Examiner*—Joshua D Campbell
*Assistant Examiner*—I-Chan Yang (57) ABSTRACT

Aspects of the subject matter described herein relate to a page flow framework. In aspects, a page flow engine includes logic to navigate between pages. To make its determination of what page is next, the page flow engine uses an indication of the current page and may also use properties associated with the pages. These properties may be filled in as a user enters values on the pages, for example. The page flow engine does not need any additional information to determine the next page besides the current page and the properties. The page flow engine may also store the pages visited in a travel log. This may be used to return previous pages. The page flow engine allows the page flow logic to be removed from the pages and placed in a centralized component. This simplifies creation and maintenance of page flow.

16 Claims, 6 Drawing Sheets

PAGE FLOW FRAMEWORK

BACKGROUND

In traditional page flow frameworks, the pages themselves include code that determines the next and previous pages. Developers using such frameworks often find themselves placing complex page flow logic within each page. Placing page flow logic with each page may cause a maintenance problem, especially when the page flow logic is complex or the pages are often being added or deleted.

SUMMARY

Briefly, aspects of the subject matter described herein relate to a page flow framework. In aspects, a page flow engine includes logic to navigate between pages. To make its determination of what page is next, the page flow engine uses an indication of the current page and may also use properties associated with the pages. These properties may be filled in as a user enters values on the pages, for example. The page flow engine does not need any additional information to determine the next page besides the current page and the properties. The page flow engine may also store the pages visited in a travel log. This may be used to return previous pages. The page flow engine allows the page flow logic to be removed from the pages and placed in a centralized component. This simplifies creation and maintenance of page flow.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
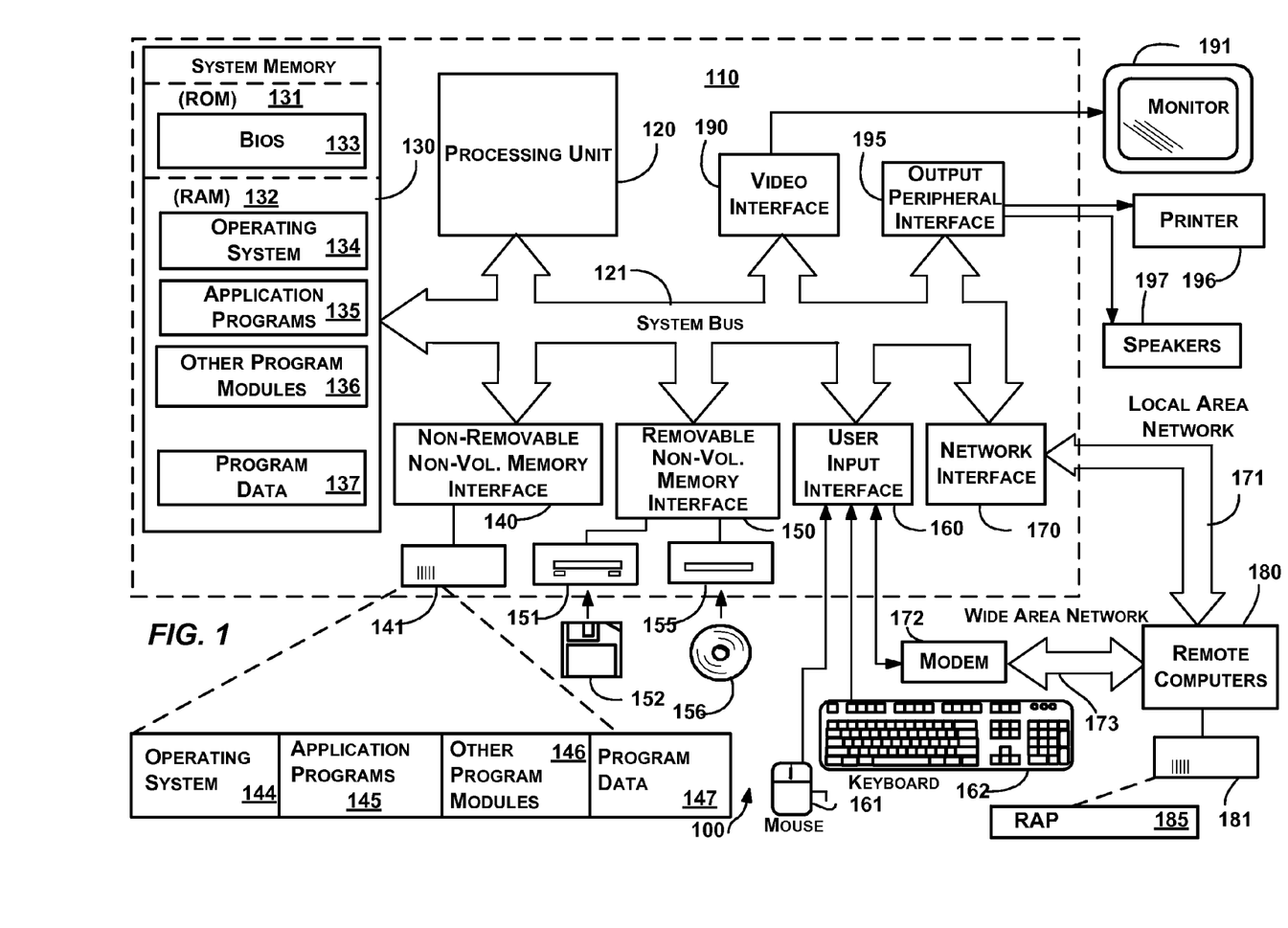
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Page Flow Framework

As mentioned previously, placing page flow logic in pages may cause a maintenance problem. For example, if a another page is added to a set of pages, page flow logic for one or more of the existing pages may need to be modified to account for the new page. Similarly, if a page is deleted from a set of pages, page flow logic for one or more of the remaining pages may need to be modified to account for the deleted page.

Pages that are connected together via page flow logic may be used in many different kinds of programs. For example, an installation wizard may collect data in various data input screens. The wizard may then use this data to install or configure a software package, for example. In another example, a set of pages may be connected via page flow logic used to collect data for programs that use the data to perform a particular function. For example, tax preparation software may use pages to collect information to prepare a tax return. As another example, a word processing program may use pages to collect information to prepare a merge letter. It will be readily recognized that pages may be used in a variety of ways. In one or more embodiments, aspects of the subject matter described herein may be used in situations in which navigation between pages is desired as will be described in more detail below.

The term page may include any mechanism for inputting and/or displaying data. Some exemplary mechanisms include a graphical user interface (GUI) window having input fields, a DOS, Linux, or other operating system command prompt window, an Internet browser, and the like.

Figure 2:
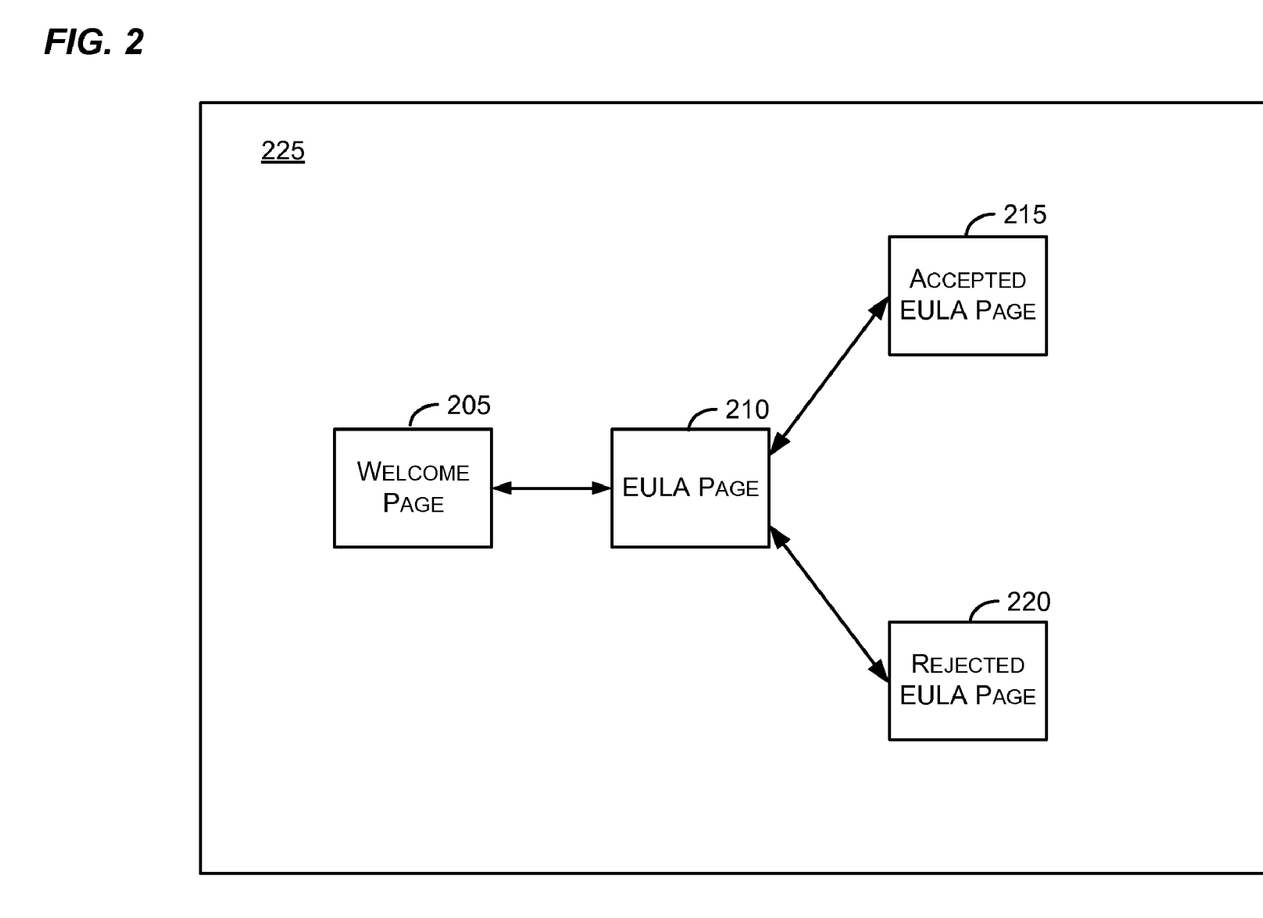
FIG. 2 is a block diagram that generally represents an exemplary flow of pages in accordance with aspects of the subject matter described herein.

FIG. 2 is a block diagram that generally represents an exemplary flow of pages in accordance with aspects of the subject matter described herein. As illustrated, there are four pages: a welcome page 205, an end user license agreement (EULA) page 210, an accepted EULA page 215, and a rejected EULA page 220.

Page flow moves from the welcome page 205 to the EULA page 210 after a user presses a next button, for example. After the EULA page 210, page flow moves to either the accepted EULA page 215 or the rejected EULA page 220, depending on whether the user accepts or rejects the EULA.

The pages 210, 215, and 220 may include previous buttons that allow the user to return to a previous page. For example, if the user is currently viewing the EULA page 210 and selects a previous button, the welcome page 205 may be displayed. If the user is currently viewing the accepted EULA page 215 or the rejected EULA page 220 and selects a previous button, the EULA page 210 may be displayed.

It will be appreciated that the example illustrated in FIG. 2 represents a relatively simple flow between pages. In other embodiments, there may be more, fewer, and/or different page flows without departing from the spirit or scope of aspects of the subject matter described herein.

A component 225 may logically include the pages 205, 210, 215, and 220. The component 225 may also include a function that computes the next page. The function may take as a parameter the current page (or an identifier thereof) and may reference a data structure that includes properties that are associated with the pages.

In some embodiments, a property as used herein includes data that may be entered, changed, and/or otherwise manipulated via a user interface, a program, or otherwise. A property may also include data that is derived from the data above. In other embodiments, a property may also include methods associated with the data.

Properties obtained from or modified via a page may be stored in a variable or other data structure in volatile or non-volatile memory. A collection of properties may be stored in a data structure that is sometimes referred to herein as a property bag. Property bags may be stored in a collection that is sometimes referred to herein as a global property bag.

The function of the component 225 that computes and returns the next page is sometimes referred to herein as QueryNextPage. It is to be recognized, however, that any function or method, however named, may also be used so long as it returns or navigates to a next page when given a property bag together with the current page.

QueryNextPage includes logic for computing the next page. It provides a centralized repository for containing the logic so that the logic does not need to reside in the pages themselves. In one embodiment, the pages may be flow-logic agnostic. That is, each page may be ignorant of what pages precede or follow the page. Instead, each page may focus on receiving user input and populating properties based thereon. In this embodiment, pages may be removed from a wizard or other page flow program and used independently. For example, a page for entering a user password in a wizard for creating a new user may also be used for as a page to reset user passwords. All that may need to be changed for the page to function in both capacities is changing the title.

The component 225 may also include a function that returns the previous page. This function may utilize a travel log. The travel log indicates a sequence of the pages the user has visited. It may be implemented as a linked list, a stack, or some other data structure. When the user presses a previous button, the travel log is consulted to determine the page the user was on just previous to the current page. This page is then loaded and displayed to the user.

Figure 3:
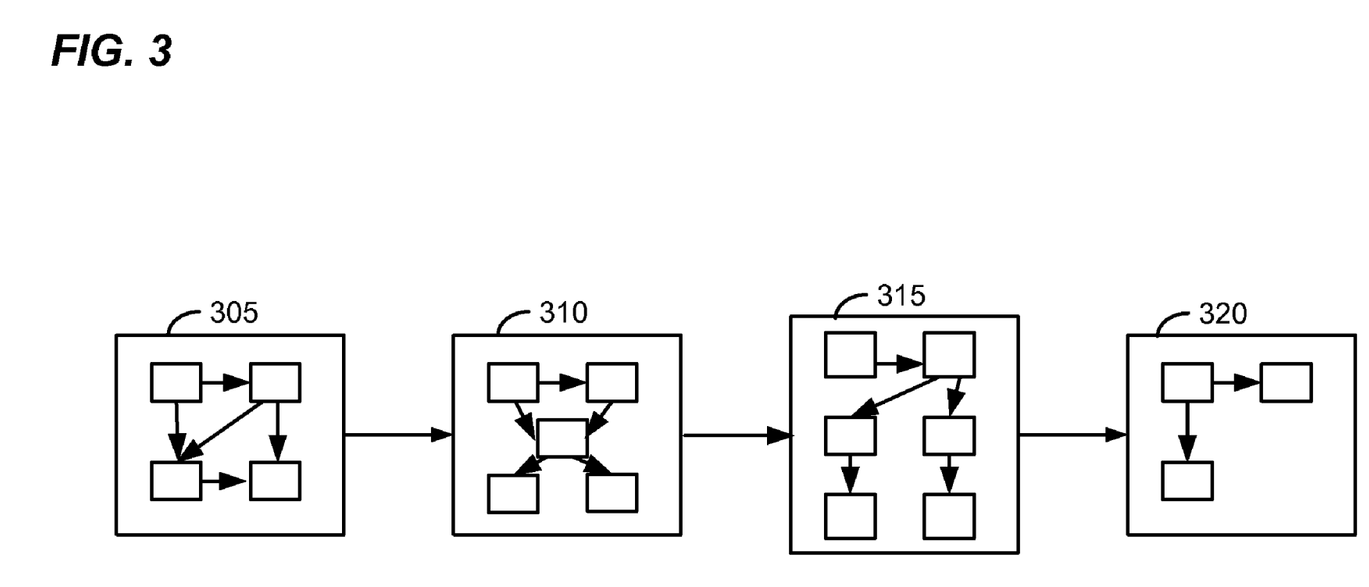
FIG. 3 is a block diagram that generally represents a collection of components according to aspects of the subject matter described herein.

FIG. 3 is a block diagram that generally represents a collection of components according to aspects of the subject matter described herein. As illustrated, FIG. 3 includes four components 305, 310, 315, and 320. Each of the components 305-320 includes pages and logic (e.g., a QueryNextPage function) for page flow. In other embodiments, more, fewer, and/or components including different pages and/or page flows may be constructed.

In one embodiment, after the last page in a particular component is exited, the first page of the next component is entered. In other embodiments, which component to enter after a component is executed is determined by a function of a container that includes (or references) the components. This function may operate similarly to the QueryNextPage function except at a component level. It may take as input the current component and may use a global property bag to determine the next component. When the next component is loaded, it may use its QueryNextPage function and pass the previous page.

Figure 4:
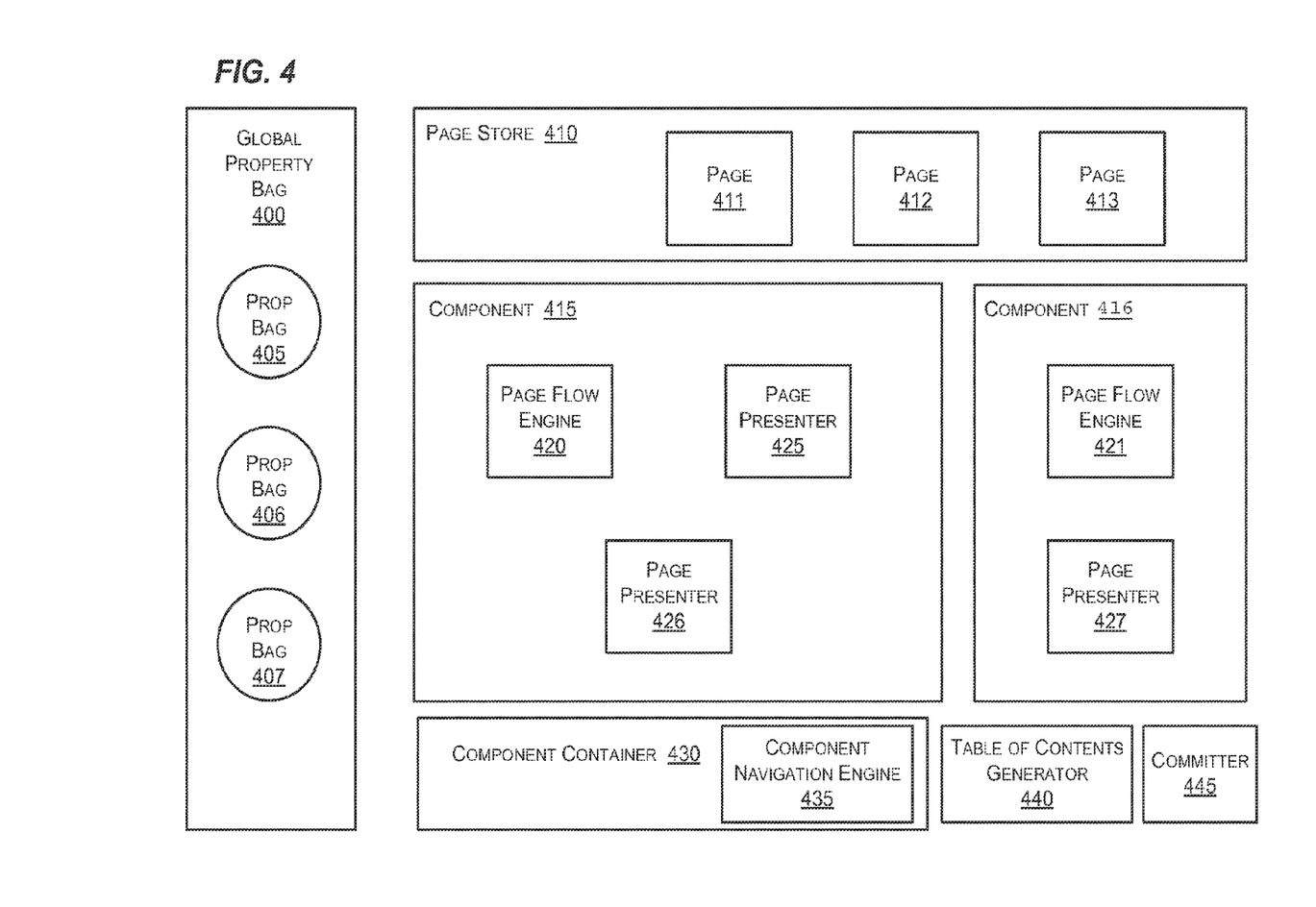
FIG. 4 is a block diagram that generally represents a component level view of an exemplary page flow framework according to aspects of the subject matter described herein.

FIG. 4 is a block diagram that generally represents a component level view of an exemplary page flow framework according to aspects of the subject matter described herein. The view includes a global property bag 400, a page store 410, components 415 and 416, component container 430, table of contents generator 440, and committee 445.

The global property bag 400 includes property bags 405-407. Each of the property bags includes properties that correspond to data that may be entered or derived from a page such as the pages 411-413.

The page store 410 includes code and/or attributes associated with the pages 411-412. The page store 410 may provide a page (or reference thereto) to a requester such as one of the page presenters 425-427.

The components 415 and 416 include page flow engines 420 and 421, respectively. Each page flow engine includes logic for navigating the pages associated with its respective component. A QueryNextPage function as well as logic for navigating to previous pages may be included in each page flow engine. Each page flow engine 420 may obtain properties from the global property bag 400 to determine which page is next.

The page presenters 425-427 may include code for interacting with the page store 410 to obtain and display pages as well as interacting with the component navigation engine 435. The page presenters 425-427 may also include (or be associated with) validation code for validating properties in the property bags 405-407.

The component container 430 may include references to the components 415 and 416 as well as a component navigation engine 435. In one embodiment, the component navigation engine 435 may determine which component is next based strictly on the current component. In another embodiment, the component navigation engine 435 may also use one or more properties in the global property bag 400 in determining which component is next.

The table of contents generator 440 may generate a table of contents for pages. To generate the table of contents, the table of contents generator 440 may call the component container 430 to obtain the first component. Using the first component, the table of contents generator may call QueryNextPage to obtain the first page of the component. The table of contents generator 440 may call QueryNextPage again with the first page as an argument to get the next page and so forth until no pages are returned by QueryNextPage. When the last page of one component is reached, the QueryNextPage for the next component may be called until no pages are returned for the next component and so forth until all components' QueryNextPage return no additional pages. To work correctly for the table of contents generator 440, QueryNextPage function implementations should have no adverse side effects and base their return value solely on the inputs, data, and current page.

One or more of the properties of a page may include information that may be placed in a table of contents by the table of contents generator 440. For example, a property of a page may include a text value that indicates what to put in a table of contents.

The property bag for a page may include user input values and expected user input values. Before a user has entered data in a page, the user input values of a page may be blank. As page flow may depend on properties in a page, the property bag for a page may be initialized with expected user input values (e.g., it is expected that the user will accept the EULA). When the table of contents generator 440 creates a table of contents, in one embodiment, if a user has not entered a value for a particular property, the QueryNextPage function may use the expected user input value to determine a page that will likely come after the current page. In another embodiment, this may be done by copying an expected user input value to each user input value that has not been entered yet prior to calling QueryNextPage and then afterwards setting each such replaced user input value with its previous value (e.g., a blank value). This may be done, for example, to simplify QueryNextPage so that it does not have to be coded to use expected values in some cases and property values in others.

Expected values may also be used to pre-populate data on pages in the expected page flow path. For example, pages that are on the expected path may be instructed to do any pre-processing they need to do so that they can be ready should they happen to be visited. For example, the pages may fetch data from remote databases or perform other expensive operations so that they can prepare to display data should the user navigate to them. The pages may also be informed if they no longer need to pre-populate data. For example, if a user takes a different path in a page flow, pages that were in the current expected path may be informed so that they may stop work in pre-populating data.

The committer 445 may be used to take actions with respect to the properties included in the global property bag 400. For example, after collecting the properties in the property bags 405-407 via the pages 411-413, the committer 445 may install components on a computer system based on the properties. As another example, after collecting the properties, the committer may add or delete users, establish groups and rights, and do other user management. It will be readily recognized that the committer 445 may be used in a variety of situations without departing from the spirit or scope of aspects of the subject matter described herein.

In one embodiment, the property bags 405-407 are populated via the pages 411-413. In another embodiment, however, the property bags may be populated via a file that includes the needed data. In some cases, it may be easier to populate properties via a file than by entering these values via the pages 411-413. From the committer 445's perspective, it may be irrelevant where the properties come from. The committer 445 may display progress as it performs various actions based on the properties.

Figure 5:
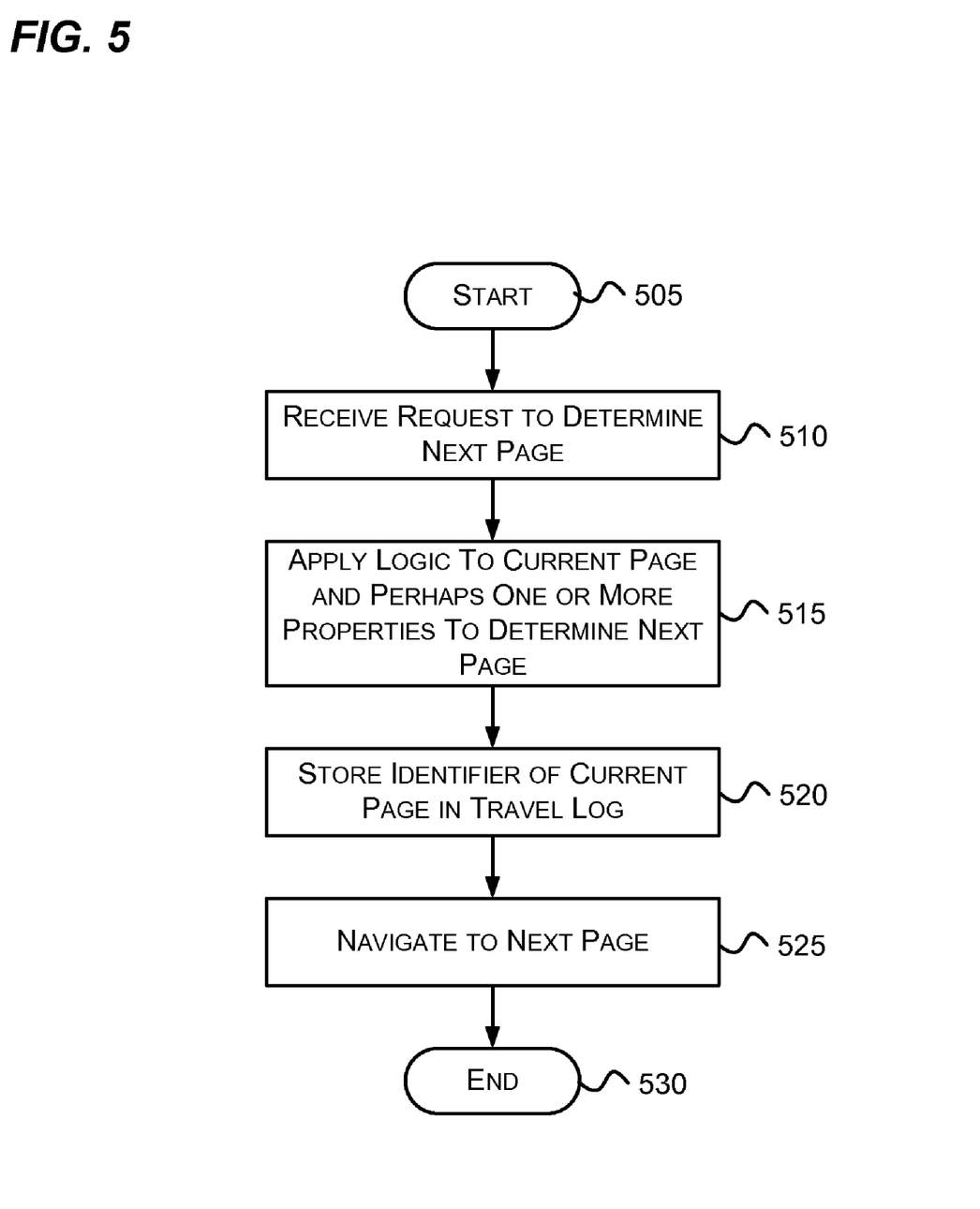
FIGS. 5-6 are flow diagrams that generally represent exemplary actions that may occur in accordance with aspects of the subject matter described herein
Figure 6:
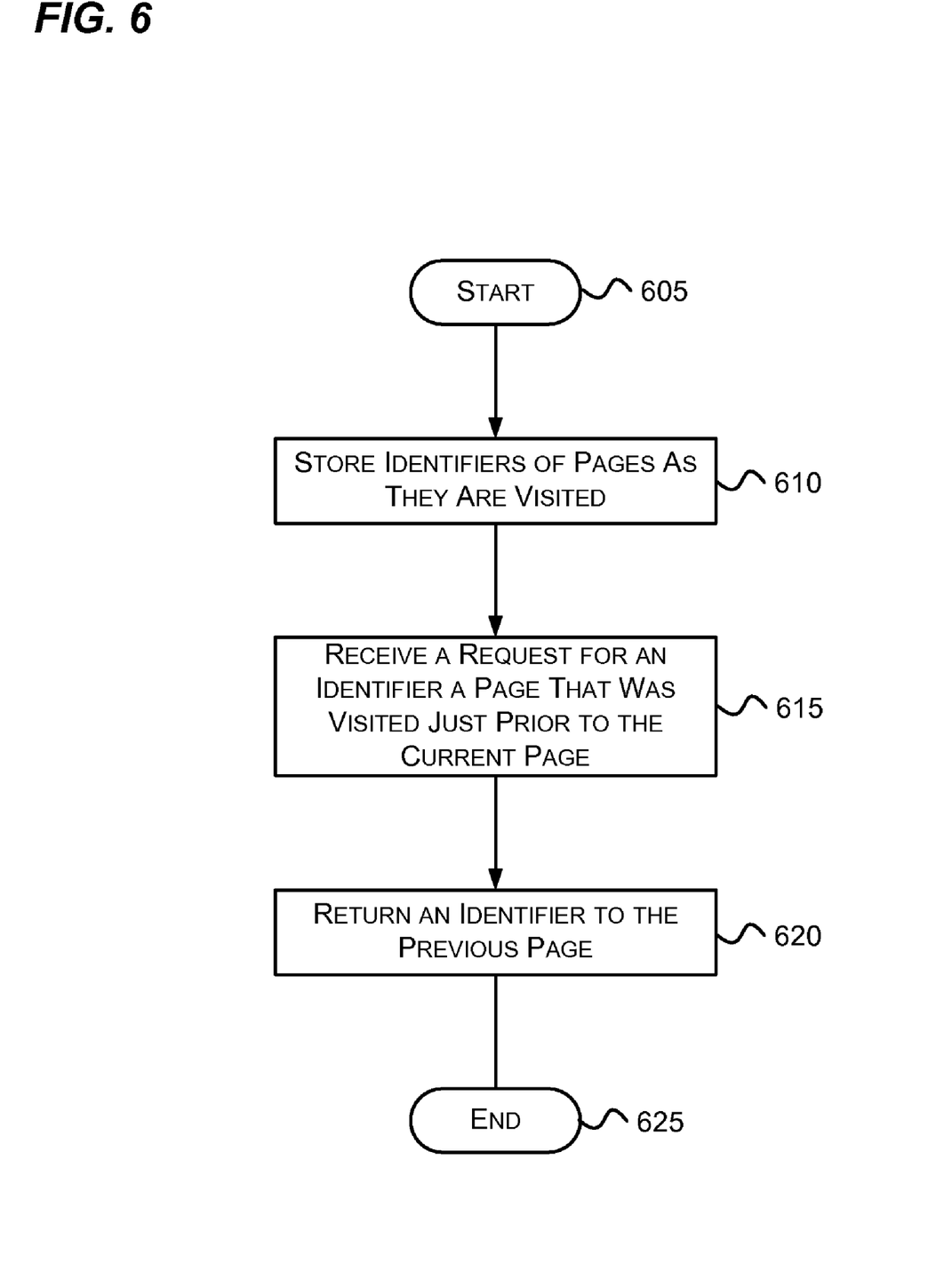

FIGS. 5-6 are flow diagrams that generally represent exemplary actions that may occur in accordance with aspects of the subject matter described herein. For simplicity of explanation, the methods described in conjunction with FIGS. 5 and 6 are depicted and described as a series of acts. It is to be understood and appreciated that the aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methods in accordance with aspects of the subject matter described herein. In addition, those skilled in the art will understand and appreciate that the methods could alternatively be represented as a series of interrelated states via a state diagram or as events.

Turning to FIG. 5, at block 505, the actions begin. At block 510, a request to determine a next page is received. For example, referring to FIG. 4, a page flow engine 420 receives a request to determine the next page. As mentioned previously, the request may include an identifier of the current page. In another embodiment, the current page may be included in a global variable or may be otherwise accessible (e.g., through a function call). In such embodiments, the request does not need to include an identifier of the current page.

At block 515, the logic is applied to the current page and perhaps one or more properties to determine the next page. For example, referring to FIG. 2, if the current page is the EULA page 210 and the user has indicated acceptance of the terms of the EULA (as is reflected by a property in a property bag associated with the EULA page 210), the page flow engine 420 of FIG. 4 may determine that the next page is the accepted EULA page 215.

In some cases, there is no need to consult a property to determine the next page. For example, referring to FIG. 2, if the user hits next from the welcome page 205, the next page is the EULA page 210, regardless of any properties in any property bags.

At block 520, an identifier of the current page is stored in a travel log. This is done so that if a previous page is desired, the travel log can be consulted instead of using complicated previous page logic.

At block 525, the next page is navigated to. In one embodiment, this comprises, returning an identifier of the page and passing this page to a page presenter. The page presenter may then display the page. In another embodiment, the component may call code to display the next page.

At block 530, the actions end.

Turning to FIG. 6, at block 605, the actions begin. At block 610, identifiers of pages are stored in a travel log as the pages are visited. For example, referring to FIG. 4, the page flow engines 420 and 421 may store identifiers of pages as the pages are visited in a travel log.

At block 615, a request for an identifier of a page that was visited just prior to the current page is received. For example, referring to FIG. 4, the page flow engine 420 may receive a request to navigate to a previous page. Referring to FIG. 2, if the user has navigated to the rejected EULA page 220 and hits the previous button, this may cause the page flow engine 420 to receive a request to navigate to a previous page.

At block 620, an identifier to the previous page is returned. This may be done by consulting the travel log in which the page identifiers are stored.

At block 625, the actions end.

As can be seen from the foregoing detailed description, aspects have been described related to a page flow framework. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions, which when executed perform actions, comprising:
   at a component that includes logic for determining flow between pages, receiving a request to determine a next page, the component having a knowledge of a current page and having access to properties associated with the pages;
   determining the next page via the logic;
   navigating to the next page;
   creating a table of contents by repeated requests to determine a next page to the component; and
   copying an expected value of a property to an actual value of the property in preparation of creating the table of contents and setting the actual value of the property back to its original value after creating the table of contents.

2. The computer storage medium of claim 1, wherein navigating to the next page comprises returning, from the component, an identifier of the next page.

3. The computer storage medium of claim 1, wherein navigating to the next page comprises calling code to display the next page.

4. The computer storage medium of claim 1, wherein the component obtains a knowledge of the current page by an identifier of the current page passed as a parameter of the request.

5. The computer storage medium of claim 1, wherein determining the next page via the logic comprises applying the logic to one or more of the properties.

6. The computer storage medium of claim 1, wherein determining the next page via the logic comprises applying the logic in view of the current page.

7. The computer storage medium of claim 1, wherein the component includes references to the pages and wherein the logic for determining flow between pages is not in the pages.

8. The computer storage medium of claim 1, further comprising storing identifiers of visited pages in a data store and retrieving an identifier in response to a request to determine a previous page.

9. In a computing environment, an apparatus, comprising:
   a computer storage medium that comprises:
      a page store capable of storing one or more pages, each page capable of inputting and displaying data; and
      a property store capable of storing one or more property bags, each property bag including properties associated with one of the pages;
      a page flow engine having logic to determine a next page, the page flow engine having knowledge of a current page and access to the property store, the logic utilizing the current page and one or more of the properties in the property store to determine the next page; and
      a table of contents generator operable to generate a table of contents by repeatedly calling the page flow engine to obtain a sequence of next pages;
   wherein the page flow engine further utilizes an expected value of property to determine a next page when the property has not been entered.

10. The apparatus of claim 9, wherein the page flow engine is associated with a first component that is associated with a first set of one or more pages, and further comprising a second component that is associated with a second set of pages, the second component including another page flow engine having logic to determine a next page in the second set, the other page flow engine having knowledge of a current page within the second set of pages and access to another property store, other page flow engine utilizing the current page of the second set and one or more of the properties in the other property store to determine the next page in the second set.

11. The apparatus of claim 9, further comprising a component container including references to the first and second components, the component container including a component navigation engine for navigating between the first and second components.

12. The apparatus of claim 9, further comprising a committer operable to use properties in the property store to make changes to a system state.

13. The apparatus of claim 12, wherein properties within the property store are populated via a file without the use of the one or more pages.

14. A method implemented at least in part by a computer, the method comprising:
   storing identifiers associated with pages that have been visited;
   receiving a request for a previous page that was visited just before a current page;
   returning an identifier to the previous page;
   copying an expected value of a property that is associated with the current page or the previous page to an actual value of the property in preparation of creating a table of contents that includes information that corresponds to the current page and the previous page; and
   setting the actual value of the property back to its original value after creating the table of contents.

15. The method of claim 14, wherein the identifiers are stored in a travel log, the travel log identifying a sequence in which the pages were visited.

16. The method of claim 14, wherein the request is received at a component that is not part of any of the pages.

* * * * *